(12) United States Patent
James et al.

(10) Patent No.: US 6,993,022 B1
(45) Date of Patent: Jan. 31, 2006

(54) METHOD OF AND APPARATUS FOR DIRECTLY MAPPING COMMUNICATIONS THROUGH A ROUTER BETWEEN NODES ON DIFFERENT BUSES WITHIN A NETWORK OF BUSES

(75) Inventors: David V. James, Palo Alto, CA (US); Hisato Shima, Sunnyvale, CA (US); Bruce Alan Fairman, Woodside, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1123 days.

(21) Appl. No.: 09/611,766

(22) Filed: Jul. 6, 2000

(51) Int. Cl.
*H04L 12/28* (2006.01)
*H04L 12/52* (2006.01)

(52) U.S. Cl. ............... 370/389; 370/401; 370/402; 370/400; 370/392; 709/245; 709/242; 709/224

(58) Field of Classification Search ........... 370/256, 370/257, 258, 402, 401, 403, 410, 395.54, 370/389, 392; 710/110, 311, 312, 100; 709/245, 709/221, 224, 242
See application file for complete search history.

(56) References Cited

U.S. PATENT DOCUMENTS

| | | | |
|---|---|---|---|
| 5,402,419 A | 3/1995 | Osakabe et al. ........... 370/85.1 |
| 5,485,458 A | 1/1996 | Oprescu et al. ............ 370/85.2 |
| 5,497,466 A | 3/1996 | Roden et al. ............... 395/306 |
| 5,499,344 A | 3/1996 | Elnashar et al. ........... 395/250 |
| 5,500,946 A | 3/1996 | Roden et al. ............... 395/308 |
| 5,517,494 A | 5/1996 | Green ....................... 370/60 |
| 5,594,734 A | 1/1997 | Worsley et al. ............ 370/395 |

(Continued)

OTHER PUBLICATIONS

Michael Teener et al., "A Bus on a Diet—The Serial Bus Alternative, An Introduction to the P1394 High performance Serial Bus" Apple Computer, Inc. Santa Clara, CA, Pub. Date.: Feb. 24, 1992, pp. 316-321.

(Continued)

*Primary Examiner*—Ajit Patel
*Assistant Examiner*—Chuong Ho
(74) *Attorney, Agent, or Firm*—Haverstock & Owens LLP

(57) ABSTRACT

Within the routing method and apparatus of the present invention, a router is coupled to multiple buses, each of the buses having one or more nodes. A node on a first bus structure sending a communication to a node on a second bus structure includes an address value within the communication addressed into the address space of the router. When the packet is received, the router then preferably uses a routing value within the address value to determine the bus number and node number of the target node. The router then uses this bus number and node number to remap the address value to the target node. This remapped address value is then included within the packet and transmitted on the appropriate bus structure directed to the appropriate node. In an alternate embodiment, the address value in a packet received by the router includes a table index value and a direct offset value. The table index value provides an index value into a table within the router and corresponds to a location in the table which includes a corresponding expanded bit value. The corresponding expanded bit value and the direct offset value are used by the router to remap the address value to the target node. This remapped address value is then included within the packet and transmitted on the appropriate bus structure directed to the appropriate node.

29 Claims, 7 Drawing Sheets

U.S. PATENT DOCUMENTS

| | | | |
|---|---|---|---|
| 5,602,841 A | 2/1997 | Lebizay et al. | 370/413 |
| 5,617,419 A | 4/1997 | Christensen et al. | 370/471 |
| 5,623,610 A | 4/1997 | Knoll et al. | 395/281 |
| 5,664,124 A | 9/1997 | Katz et al. | 395/309 |
| 5,815,668 A | 9/1998 | Hashimoto | 395/200.68 |
| 5,941,964 A | 8/1999 | Young et al. | 710/100 |
| 6,034,964 A | 3/2000 | Fukushima et al. | 370/401 |
| 6,389,496 B1 * | 5/2002 | Matsuda | 710/316 |
| 6,445,711 B1 * | 9/2002 | Scheel et al. | 370/402 |
| 6,496,862 B1 * | 12/2002 | Akatsu et al. | 709/224 |
| 6,542,510 B1 * | 4/2003 | Fujimori et al. | 370/402 |
| 6,647,446 B1 * | 11/2003 | James et al. | 710/100 |
| 6,678,781 B1 * | 1/2004 | Domon | 710/312 |

OTHER PUBLICATIONS

P1394 Standard For A High Performance Serial Bus, IEEE, 1995.

"The IEEE—1394 High Speed Serial Bus," R.H.J. Bloks, Philips Journal Of Research, vol. 50, No. 1/2, pp. 209-216, 1996.

SPI, "Architecture for High Performance Transparent Bridges" Jul., 1992, IBM Corporation, 3 pages.

"Digital Interface for Consumer Audio/Video Equipment" The Netherlands, 46 pages.

* cited by examiner

| Bus | Node | Tag | Bus# | Node# | Offset Value |
|-----|------|-----|------|-------|--------------|
| 10  | 6    | 2   | 4    | 6     | 36           |

METHOD OF AND APPARATUS FOR DIRECTLY MAPPING COMMUNICATIONS THROUGH A ROUTER BETWEEN NODES ON DIFFERENT BUSES WITHIN A NETWORK OF BUSES

FIELD OF THE INVENTION

The present invention relates to the field of transmitting communications between nodes on different buses within a bus structure including multiple buses. More particularly, the present invention relates to the field of transmitting communications through a routing device between nodes on different buses within a bus structure including multiple buses.

BACKGROUND OF THE INVENTION

The IEEE Std 1394-1995 standard, "1394 Standard For A High Performance Serial Bus," is an international standard for implementing an inexpensive high-speed serial bus architecture which supports both asynchronous and isochronous format data transfers. In addition, the IEEE Std 1394-1995 bus has a universal clock called the cycle timer. This clock is synchronized on all nodes. Isochronous data transfers are real-time transfers which take place based on the universal clock such that the time intervals between significant instances have the same duration at both the transmitting and receiving applications. Each packet of data transferred isochronously is transferred in its own period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE Std 1394-1995 standard bus architecture provides multiple independent channels for isochronous data transfer between applications. A six bit channel number is broadcast with the data to ensure reception by the appropriate application. This allows multiple applications to simultaneously transmit isochronous data across the bus structure.

Asynchronous transfers are traditional reliable data transfer operations which take place as soon as arbitration is won and transfer a maximum amount of data from a source to a destination. Asynchronous transfers are used for control purposes, including the setup of isochronous communications.

The IEEE Std 1394-1995 standard provides a high-speed serial bus for interconnecting digital devices thereby providing a universal I/O connection. The IEEE Std 1394-1995 standard defines a digital interface for the application thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE Std 1394-1995 standard is very thin in size compared to other bulkier cables used to connect such devices in other connection schemes. Devices can be added and removed from an IEEE Std 1394-1995 bus while the bus is operational. If a device is so added or removed the bus will then automatically reconfigure itself for transmitting data between the then existing nodes A node is considered a logical entity with a unique address on the bus structure. Each node provides in a standard address space, an identification ROM, a standardized set of control registers and in addition, its own address space.

The IEEE Std 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE Std 1394-1995 cable. The physical layer 16 also provides arbitration to ensure that all devices coupled to the IEEE 1394-1995 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

The IEEE Std 1394-1995 utilizes a 64 bit address value for communicating the address of a node, as illustrated in FIG. 2. The upper 16 bits of each node address represent the node_ID value, allowing address space for approximately 64,000 nodes. The node_ID field is divided into the bus_ID field and the physical_ID field or node number. The higher order 10 bits of the node_ID field specify the bus_ID. The lower order 6 bits of the node_ID field specify the physical_ID or node number corresponding to the node. Within this node_ID field the value of all "1"s is reserved for special purposes. Accordingly, this addressing scheme provides for 1023 buses, each with 63 independently addressable nodes, as illustrated in FIG. 3. As illustrated in FIG. 3, each of the bus numbers is included within the table 30. Within the space represented by each bus number is a node table 32 including entries representing each node. Within the space represented by each node is a memory table 34 representing the mapping of the address space within the node itself. Specifically, within the address space in each node, $2^{48}$ bytes are divided between register space, private space and memory space. Accordingly, within the remaining lower 48 bits of the node address, the address offset within the node itself is specified.

Routing devices are one example of devices used to route communications between nodes on different buses. Typically, a node on a first bus sending a packet to a node on a second bus, will send an indirect command to the routing device, which writes to a register space within the routing device and requests the routing device to send the packet to the node on the second bus. When receiving this request from the node on the first bus, the routing device will then reformulate the packet and send it to the node on the second bus.

Many nodes are expected to be controlled through registers located within their register space. For example, IEC-61883 is a ratified international standard for the transport of audio/video command requests and responses, which uses addresses within this register space. This standard uses the concept of plugs and plug control registers to manage and control the attributes of isochronous data flows. It should be noted that plugs do not physically exist on an audio/video device, but a plug is used to establish an analogy with existing audio/video devices where each flow of information is routed through a physical plug.

An isochronous data flow flows from one transmitting device to one or more receiving devices, by transmitting isochronous packets on an isochronous channel of the IEEE Std 1394-1995 serial bus. Each isochronous data flow is transmitted to an isochronous channel through one output plug on the transmitting device and is received from that isochronous channel through one input plug on the receiving device.

The transmission of an isochronous data flow through an output plug is controlled by an output plug control register (oPCR) and an output master plug register (oMPR) located on the transmitting device. The output master plug register controls all attributes that are common to all isochronous data flows transmitted by the corresponding transmitting device. The output plug control register controls all attributes of the corresponding isochronous data flow that are independent from attributes of other isochronous data flows transmitted by the transmitting device.

The reception of an isochronous data flow through an input plug is controlled by an input plug control register (iPCR) and an input master plug register (iMPR) located on the receiving device. The input master plug register controls all attributes that are common to all isochronous data flows received by the receiving device. The input plug control register controls all attributes of the corresponding isochronous data flow that are independent from attributes of other isochronous data flows received by the receiving device.

An isochronous data flow can be controlled by any device connected to the IEEE Std 1394-1995 bus by modifying the corresponding plug control registers. Plug control registers can be modified through asynchronous transactions on the IEEE Std 1394-1995 bus or by internal modifications if the plug control registers are located on the controlling device.

To transport isochronous data between two audio/video devices on the IEEE Std 1394-1995 bus, it is necessary for an application to connect an output plug on the transmitting device to an input plug on the receiving device using an isochronous channel. The relationship between one input plug, one output plug and one isochronous channel is called a point-to-point connection. A point-to-point connection can only be broken by the application or initiating device that established it. An application can also just start the transmission or reception of an isochronous data flow on its own device by connecting one of its output or input plugs respectively to an isochronous channel. The relationship between one output plug and one isochronous channel is called a broadcast-out connection. The relationship between one input plug and one isochronous channel is called a broadcast-in connection. Broadcast-out and broadcast-in connections are collectively called broadcast connections. A broadcast connection can be established only by the device on which the plug is located, but it can be broken by any device.

SUMMARY OF THE INVENTION

Within the routing method and apparatus of the present invention, a router is coupled to multiple buses, each of the buses having one or more nodes. A node on a first bus structure sending a communication to a node on a second bus structure includes an address value within the communication addressed into the address space of the router. When the packet is received, the router then preferably uses a routing value within the address value to determine the bus number and node number of the target node. The router then uses this bus number and node number to remap the address value to the target node. This remapped address value is then included within the packet and transmitted on the appropriate bus structure directed to the appropriate node. In an alternate embodiment, the address value in a packet received by the router includes a table index value and a direct offset value. The table index value provides an index value into a table within the router and corresponds to a location in the table which includes a corresponding expanded bit value. The corresponding expanded bit value and the direct offset value are used by the router to remap the address value to the target node. This remapped address value is then included within the packet and transmitted on the appropriate bus structure directed to the appropriate node.

In one aspect of the present invention, a method of routing communications from a first node on a first bus to a second node on a second bus includes receiving a communication from the first node including an address value having a bus number and a node number, together forming an address of a routing device which is coupled to both the first and second buses, and a routing value used to determine an address of the second node, obtaining the routing value from the communication, remapping the address value of the communication to correspond to the address of the second node utilizing the routing value and transmitting the communication on the second bus to the second node. The communication is a bus packet. The routing value preferably includes the address of the second node and an offset value within memory space of the second node. Alternatively, remapping the address value of the communication includes utilizing a table index value within the routing value to obtain the address of the second node from a location within a routing table corresponding to the table index value. The first and second buses both preferably substantially comply with a version of an IEEE Std 1394 standard. The method further includes determining if the address value within the communication received from the first node is addressed to the routing device.

In another aspect of the present invention, a direct mapping IEEE 1394 bus packet is used for communications transmitted from a first node on a first bus to a second node on a second bus, and includes an address value having a bus number and a node number, together forming an address of a routing device which is coupled to both the first and second buses, and a routing value used to determine an address of the second node. Preferably, the routing value includes the address of the second node and an offset value within memory space of the second node. Alternatively, the routing value includes a table index value which provides an index into a routing table within the routing device. The address of the second node is obtained from a location within the routing table corresponding to the table index value. Preferably, the first and second buses both substantially comply with a version of an IEEE Std 1394 standard.

In yet another aspect of the present invention, a routing device configured for coupling between a first bus and a second bus for routing communications from a first node on the first bus to a second node on the second bus includes means for receiving a communication from the first node including an address value having a bus number and a node number, together forming an address of the routing device, and a routing value used to determine an address of the second node, means for extracting coupled to the means for receiving for extracting the routing value from the address value within the communication, means for remapping coupled to the means for extracting for utilizing the routing value to remap the address value of the communication thereby forming a remapped communication with a remapped address value corresponding to the address of the second node and means for transmitting coupled to the means for remapping for transmitting the remapped communication on the second bus to the second node. The communication and the remapped communication are bus packets. Preferably, the routing value includes the address of the second node and an offset value within memory space of the second node. Alternatively, the means for remapping utilizes a table index value within the routing value to obtain the address of the second node from a location within a routing table corresponding to the table index value. The routing table is included within the routing device. Preferably, the first and second buses both substantially comply with a version of an IEEE Std 1394 standard.

In still yet another aspect of the present invention, a routing device configured to couple between a first bus and a second bus to route communications from a first node on the first bus to a second node on the second bus includes a receiving circuit configured to receive a communication from the first node, the communication including an address value having a bus number and a node number, together forming an address of the routing device, and a routing value used to determine an address of the second node, a parsing circuit coupled to the receiving circuit to extract the routing value from the address value within the communication, a remapping circuit coupled to the parsing circuit to obtain the routing value from the parsing circuit and remap the address value of the communication thereby forming a remapped communication with a remapped address value corresponding to the address of the second node and a transmitting circuit coupled to the remapping circuit and configured to transmit the remapped communication with the remapped address on the second bus to the second node. The communication and the remapped communication are bus packets. Preferably, the routing value includes the address of the second node and an offset value within memory space of the second node. The remapping circuit includes a routing table. Alternatively, the remapping circuit utilizes a table index value within the routing value to obtain the address of the second node from a location within the routing table corresponding to the table index value. Preferably, the first and second buses both substantially comply with a version of an IEEE Std 1394 standard.

In yet another aspect of the present invention, a network of devices includes a first bus including a first plurality of nodes, a second bus including a second plurality of nodes and a routing device coupled to the first bus and the second bus. The routing device includes a receiving circuit configured to receive a communication from one of the first plurality of nodes, the communication including an address value having a bus number and a node number, together forming an address of the routing device, and a routing value used to determine an address of a targeted one of the second plurality of nodes, a parsing circuit coupled to the receiving circuit to extract the routing value from the address value within the communication, a remapping circuit coupled to the parsing circuit to obtain the routing value from the parsing circuit and remap the address value of the communication thereby forming a remapped communication with a remapped address value corresponding to the address of the targeted one of the second plurality of nodes and a transmitting circuit coupled to the remapping circuit and configured to transmit the remapped communication with the remapped address on the second bus to the targeted one of the second plurality of nodes. The communication and the remapped communication are bus packets. Preferably, the routing value includes the address of the targeted one of the second plurality of nodes and an offset value within memory space of the targeted one of the second plurality of nodes. The remapping circuit includes a routing table. Alternatively, the routing device as claimed in claim 27 wherein the remapping circuit utilizes a table index value within the routing value to obtain the address of the targeted one of the second plurality of nodes from a location within the routing table corresponding to the table index value. Preferably, the first and second buses both substantially comply with a version of an IEEE Std 1394 standard.

DETAILED DESCRIPTION OF THE PREFERRED EMBODIMENT

A routing device according to the present invention utilizes directly mapped communications between nodes on different buses within a bus structure including multiple buses. A node on a first bus structure sending a communication to a node on a second bus structure includes an address value within the communication addressed into the address space of the router. As used herein, the term communication includes packets as well as any other appropriate form of communication between nodes on bus structures. When the router receives a packet, the router first determines if the packet is addressed to the router. If the packet is addressed to the router, the router then preferably obtains a routing value from within the address value of the packet. The router uses this routing value to determine the bus number and node number of the target node. This bus number and node number are then used by the router to remap the address value within the packet to the target node. This remapped address value is then inserted into the packet by the router in place of the address value as received. The router then utilizes a table within the router to determine to which bus interface the target node is coupled. The router then transmits the packet through the appropriate bus interface on the appropriate bus structure directed to the appropriate node.

Within an alternate embodiment of the present invention, the address value within a packet received by the router includes a table index value and a direct offset value. The table index value provides an index value into a table within the router. Within this table, the table index value corresponds to a location in the table which includes a corresponding expanded bit value. The corresponding expanded bit value and the direct offset value are used by the router to remap the address value within the packet to the target node. This remapped address value is then inserted into the packet by the router in place of the address value as received. The router then transmits the packet through the appropriate bus interface on the appropriate bus structure directed to the appropriate node.

Figure 1:
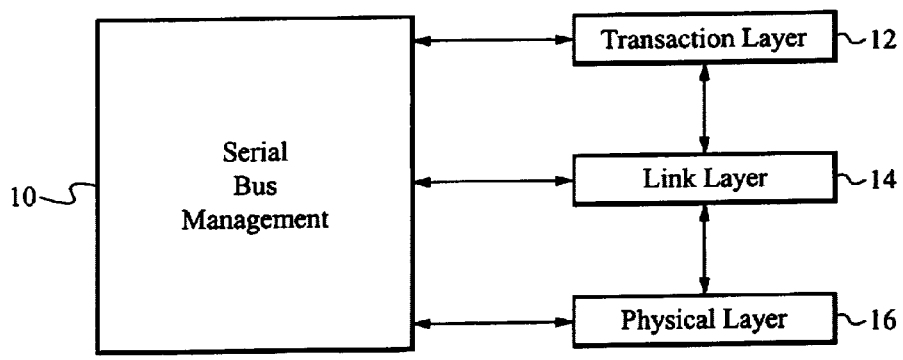
FIG. 1 illustrates a protocol defined by the IEEE Std 1394-1995 standard.
Figure 2:
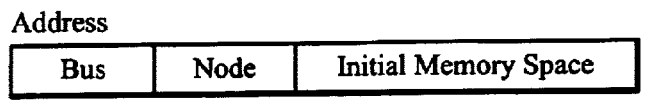
FIG. 2 illustrates a format of an address value according to the IEEE Std 1394-1995 standard.
Figure 3:
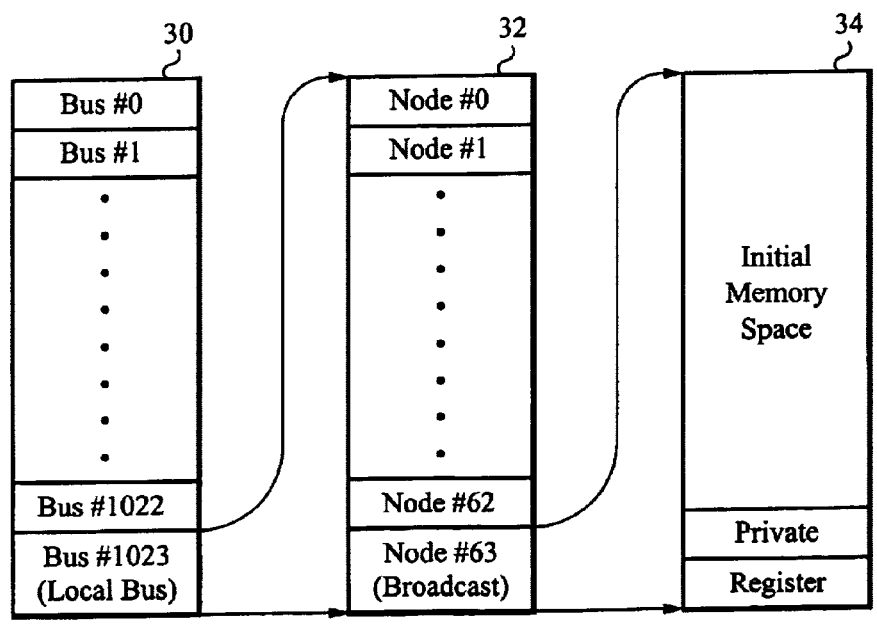
FIG. 3 illustrates an addressing scheme according to the IEEE Std 1394-1995 standard.
Figure 4:
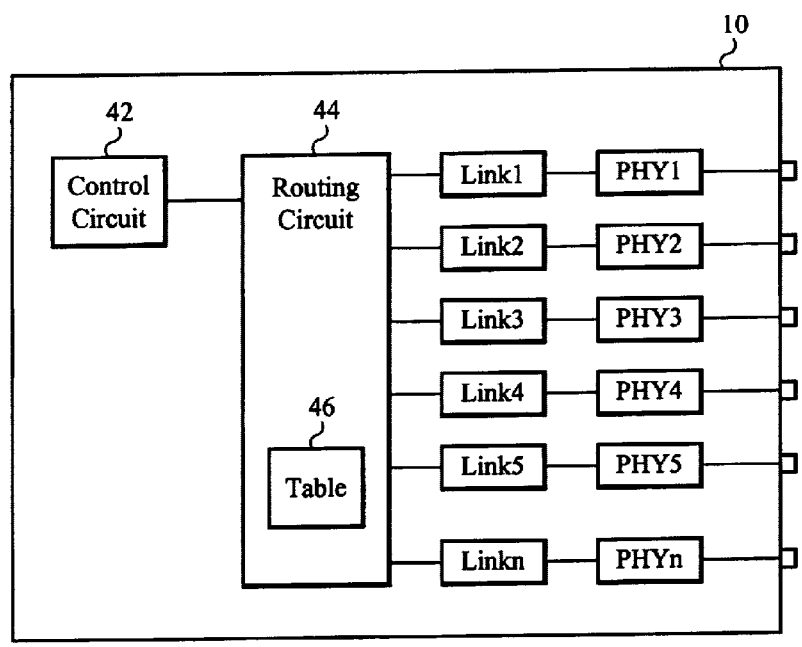
FIG. 4 illustrates a block diagram of a directly mapped AV router according to the present invention.

A directly mapped AV router according to the present invention is illustrated in FIG. 4. The router 40 includes a number of link circuits link1–linkn each coupled to a number of bus interface circuits PHY1–PHYn. Each of the bus interface circuits PHY1–PHYn is configured for coupling to an IEEE Std 1394-1995 serial bus. Each of the link circuits link1–linkn are coupled to a routing circuit 44. The routing circuit 44 includes the routing table 46 which is utilized by the routing circuit for routing communications between the buses to which the router 40 is coupled. The routing circuit 44 is coupled to a control circuit 42. Together, the routing circuit 44 and the control circuit 42 control routing operations of communications received by the router 40 from a node on one bus and transmitted to a node on another bus.

Figure 5:
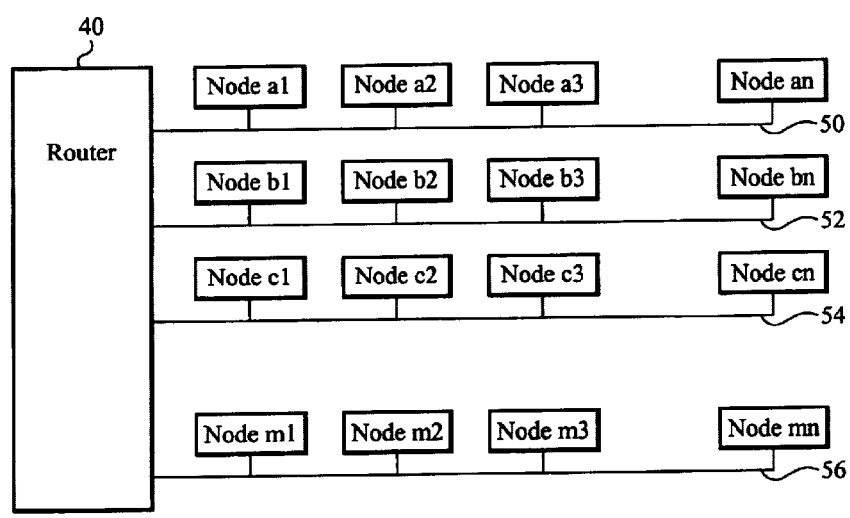
FIG. 5 illustrates an exemplary network of IEEE Std 1394-1995 buses and the router of the present invention.

An exemplary network of IEEE Std 1394-1995 buses and the router 40 is illustrated in FIG. 5. The router is coupled to the buses 50, 52, 54 and 56. Preferably, each of the buses 50, 52, 54 and 56 are IEEE Std 1394-1995 serial buses. The bus 50 includes the nodes nodea1–nodean. The bus 52 includes the nodes nodeb1–nodebn. The bus 54 includes the nodes nodec1–nodecn. The bus 56 includes the nodes nodem1–nodemn. The router 40 is utilized to route communications from any one of the nodes on any of the buses 50, 52, 54 and 56 to a node on any of the other buses 50, 52, 54 and 56. When a node on a first bus, such as the node nodea3, is sending a communication to a node on another bus, such as the node nodec2, the node nodea3 sends the communication to the router 40, directly addressed to the router 40, with a routing value included within the address value in the communication specifying that the communication is to be routed to the node nodec2. When receiving this communication, the router 40 first determines that the communication is address to the router 40. After determining that the communication is addressed to the router 40, the router 40 then analyzes the address value within the communication and extracts the routing value from the address value. The router 40 uses this routing value within the address value to determine the bus number and node number of the target node, which in this example is the node nodec2. The bus number and node number are then used by the router 40 to remap the address value within the packet to the target node. The router 40 then inserts this remapped address value into the packet in place of the received address value. The router 40 then utilizes the table 46 to determine to which bus interface circuit PHY1–PHYn the target node is coupled. After determining the appropriate bus interface, the router 40 then transmits the packet through the appropriate bus interface circuit PHY1–PHYn on the appropriate bus structure directed to the appropriate node. In this example, the router 40 transmits the packet on the bus structure 54 directed to the node nodec2. In this manner, the communications from one node to a node on a different bus are addressed to the router 40 and directly mapped into the address space of the router 40. The router 40 then uses this mapping to determine to which node and bus, the communication should be routed.

In the preferred embodiment of the present invention, the table 46 within the router 40 is utilized to determine the bus structure corresponding to the node to which the packet is to be routed and the appropriate one of the bus interface circuits PHY1–PHYn through which the packet is to be routed.

Figures 6, 7:
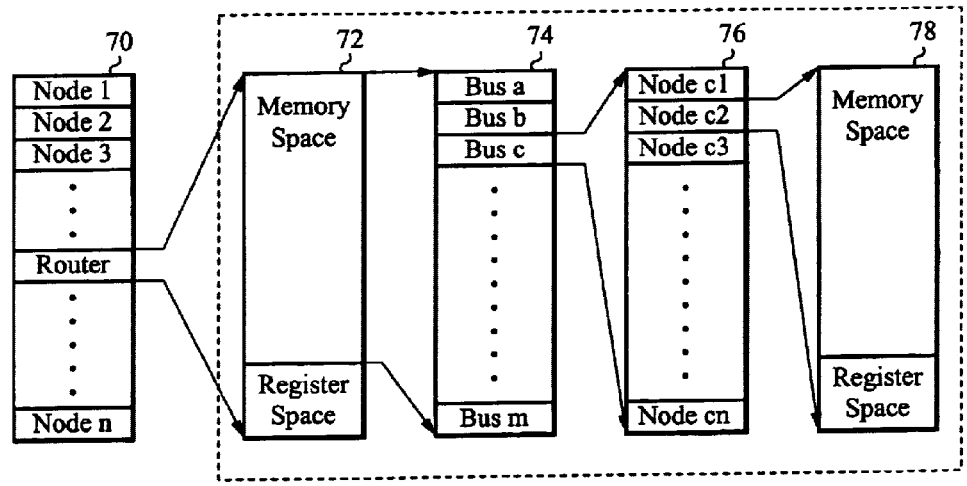
FIG. 6 illustrates a format of an address value according to the preferred embodiment of the present invention.
FIG. 7 illustrates the preferred routing addressing scheme of the present invention.

The preferred format of an address value utilized to send communications from a node on a first bus to a node on another bus, through the router 40 of the present invention, is illustrated in FIG. 6. The address value includes 64 bits. The upper 16 bits of the address value still represent the node_ID value, with the higher order 10 bits of the node ID field specifying the bus_ID value and the lower order 6 bits of the node_ID field specifying the physical_ID or node number corresponding to the addressed node. When the packet is addressed to the router 40, the node_ID field will specify the bus and node number of the router 40. Within the remaining 48 bits of the address value, there is a tag value within the higher order 2 bits distinguishes the routed packets from other packets addressed to the node, such as transactions used to access the node's configuration ROM. The next 4 bits specify the routing bus number to which the packet is to be routed. The next 6 bits specify the routing node number on that bus to which the packet is to be routed. The remaining 36 bits specify an offset value, which is for example, sign-extended to produce a 48 bit address that corresponds to the address space within the node to which the packet is to be routed. By sign-extending this offset value, commonly used addresses expected to be located within the register space or the beginning of memory space can both be accessed. The router 40 utilizes the values within the bus number field and the node number field to route the packet on the appropriate bus to the appropriate node. The value within the offset value field is preferably included within the packet by the router to appropriately map the packet into the memory space of the target node.

The preferred routing addressing scheme of the present invention is illustrated in FIG. 7. The nodes within the bus on which the packet addressed to the router 40 originates are included within the node table 70. The memory space 72 of the router 40 includes memory and register space. Within the memory space 72 of the router 40, a bus table 74 is included. The bus table 74 includes bus fields for each of the buses bus_a–bus_m coupled to the router 40. This bus table 74 is indexed by the routing bus number (FIG. 6) within the address value. Within the space represented by each bus within the bus table 74, a node table 76 includes entries representing each node on that bus. Within the space represented by each node is a memory table 78 representing the mapping of the memory space within the node itself, including the memory space and the register space for the respective node.

Figure 8:
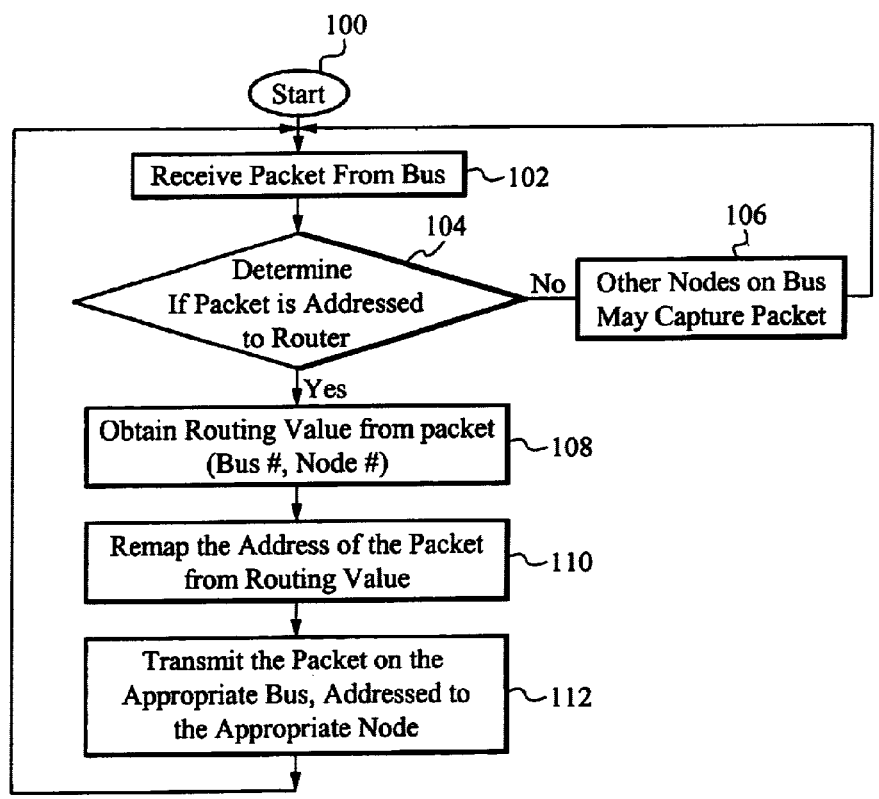
FIG. 8 illustrates a block flow diagram showing the routing method of the preferred embodiment of the present invention.

A block flow diagram showing the routing method of the preferred embodiment of the present invention is illustrated in FIG. 8. The flow diagram starts at the step 100. At the step 102, the router 40 receives a packet from one of the IEEE Std 1394-1995 serial buses to which the router 40 is coupled. At the step 104, the router 40 then determines if the packet is addressed to the router 40. If the router 40 determines that the packet is not addressed to the router 40, the packet is available to other nodes on the IEEE Std 1394-1995 serial bus from which the packet was received, at the step 106, and then returns to the step 102 to receive the next packet from the IEEE Std 1394-1995 serial bus. However, if the router 40 determines at the step 104 that the packet is addressed to the router 40, the router 40 then obtains the routing value from the address value within the packet at the step 108. This routing value includes the bus number and the node number corresponding to the node to which the router 40 should route the packet. At the step 110, the router 40 then remaps the address of the packet using the obtained routing value, as discussed above, and revises the address value within the packet to reflect the appropriate address value of the target node to which the packet is to be routed. At the step 112, the router then transmits the packet on the appropriate bus, addressed to the appropriate node.

In operation, any of the nodes within the multiple bus structure such as illustrated in FIG. 5, which includes a router 40 according to the present invention, has the ability to send communications to any of the other nodes within any of the buses of the bus structure by directly addressing the communication to the address space of the router 40, with a routing value included within the address of the communication. This routing value specifies the bus number and node number of the target node to which the communication is directed. As an example, if the node nodea3 is sending a packet to the node nodec2, the node nodea3 addresses the packet to the router 40, with a routing value in the address of the packet which includes the bus number and node number specifying the node nodec2. The node nodea3 then sends this packet to the router 40. When the router 40 receives this packet, the router 40 first determines that the packet was indeed addressed to the router 40. After determining that the packet was addressed to the router 40, the router 40 then obtains the routing value from the address value within the packet. The router 40 uses this routing value to remap the address of the packet to the node nodec2. The router 40 then revises the address value within the packet to specify the bus number and node number of the node nodec2 and transmits the packet out on the appropriate bus which includes the node nodec2. This revised address value also preferably includes the offset value. In this example, the packet is transmitted by the router 40 on the IEEE Std 1394-1995 serial bus 54. The packet is then transmitted on the bus 54 until received by the node nodec2. In this manner, a packet is transmitted from a node on a first bus to a node on a second bus, through the router 40.

Figure 9:
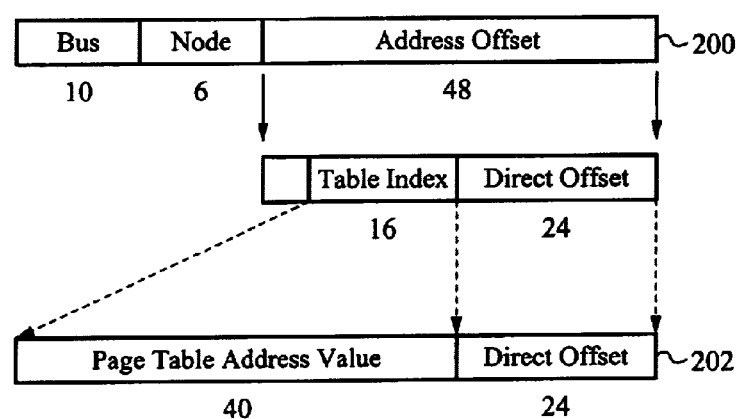
FIG. 9 illustrates a format of an address value according to an alternate embodiment of the present invention.

In an alternate embodiment of the present invention, the address value of a packet routed through the router 40 from a node on one bus to a node on another bus, includes a table index value and a direct offset value, as illustrated in FIG. 9. The upper 16 bits of the address value 200 still represent the node_ID value, with the higher order 10 bits of the node_ID field specifying the bus_ID value and the lower order 6 bits of the node_ID field specifying the physical_ID or node number corresponding to the addressed node. Again, when the packet is addressed to the router 40, the node_ID field will specify the bus number and node number of the router 40. The remaining 48 bits of the address value, include an address offset value, which is used to expand the remapped address value included in the packet when it is retransmitted from the router 40. The lower order 24 bits within the address offset field specify a direct offset value which is left unchanged by the router 40. The next higher order 16 bits include a table index value which provides an index value into the table 46 within the router 40.

In this alternate embodiment, the table 46 includes expanded address values which are indexed by corresponding table index values. The table index value within a packet corresponds to a location in the table 46 which includes a corresponding expanded address value including 40 bits. The corresponding expanded address value and the direct offset value are then combined by the router 40 into the address value for the packet. The corresponding expanded address value represents a page table address value mapped into the address space of the target node. The corresponding expanded address value also includes a bus number value and a node number value, as discussed above, in order to ensure that the packet is received by the appropriate target node. After obtaining this expanded address value from the table 46 and including it within the packet, the router 40 then transmits the packet on the appropriate bus directed to the appropriate node.

The table 46 within the router 40 in this alternate embodiment is programmed by a smart controller, either within the router or within another node in the bus structure. Alternatively, the table 46 within the router 40 is preprogrammed to correspond to anticipated addresses within the bus structure. This alternate embodiment has the advantage that it allows flexible address assignments which can be changed or modified as devices are added to or removed from the bus structure. This alternate embodiment is not preferred because it has the disadvantage over the preferred embodiment that it is currently more expensive to implement and software is required to properly initialize the table entry values.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the architecture, system and method disclosed above are only illustrative of preferred embodiments of the invention. Specifically, it will be apparent to those skilled in the art that while the preferred embodiment of the present invention is used with an IEEE Std 1394-1995 serial bus structure, the present invention could also be implemented on any other appropriate digital interfaces or bus structures, including other or later versions of the IEEE Std 1394 serial bus.

We claim:

1. A method of routing communications from a first node on a first bus to a second node on a second bus comprising:
    a. receiving a communication from the first node including an address value having a bus number and a node number, together forming an address of a routing device which is coupled to both the first and second buses, and a routing value used to determine an address of the second node;
    b. obtaining the routing value from the communication;
    c. remapping the address value of the communication to correspond to the address of the second node utilizing the routing value; and
    d. transmitting the communication on the second bus to the second node.

2. The method as claimed in claim 1 wherein the communication is a bus packet.

3. The method as claimed in claim 1 wherein the routing value includes the address of the second node and an offset value within memory space of the second node.

4. The method as claimed in claim 1 wherein remapping the address value of the communication includes utilizing a table index value within the routing value to obtain the address of the second node from a location within a routing table corresponding to the table index value.

5. The method as claimed in claim 1 wherein the first and second buses both substantially comply with a version of an IEEE Std 1394 standard.

6. The method as claimed in claim 1 further comprising determining if the address value within the communication received from the first node is addressed to the routing device.

7. A direct mapping IEEE 1394 bus packet for communications transmitted from a first node on a first bus to a second node on a second bus, the bus packet including an address value having a bus number and a node number, together forming an address of a routing device which is coupled to both the first and second buses, and a routing value used to determine an address of the second node.

8. The direct mapping IEEE 1394 bus packet as claimed in claim 7 wherein the routing value includes the address of the second node and an offset value within memory space of the second node.

9. The direct mapping IEEE 1394 bus packet as claimed in claim 7 wherein the routing value includes a table index value which provides an index into a routing table within the routing device.

10. The direct mapping IEEE 1394 bus packet as claimed in claim 9 wherein the address of the second node is obtained from a location within the routing table corresponding to the table index value.

11. The direct mapping IEEE 1394 bus packet as claimed in claim 7 wherein the first and second buses both substantially comply with a version of an IEEE Std 1394 standard.

12. A routing device configured for coupling between a first bus and a second bus for routing communications from a first node on the first bus to a second node on the second bus comprising:
   a. means for receiving a communication from the first node including an address value having a bus number and a node number, together forming an address of the routing device, and a routing value used to determine an address of the second node;
   b. means for extracting coupled to the means for receiving for extracting the routing value from the address value within the communication;
   c. means for remapping coupled to the means for extracting for utilizing the routing value to remap the address value of the communication thereby forming a remapped communication with a remapped address value corresponding to the address of the second node; and
   d. means for transmitting coupled to the means for remapping for transmitting the remapped communication on the second bus to the second node.

13. The routing device as claimed in claim 12 wherein the communication and the remapped communication are bus packets.

14. The routing device as claimed in claim 12 wherein the routing value includes the address of the second node and an offset value within memory space of the second node.

15. The routing device as claimed in claim 12 wherein the means for remapping utilizes a table index value within the routing value to obtain the address of the second node from a location within a routing table corresponding to the table index value.

16. The routing device as claimed in claim 15 wherein the routing table is included within the routing device.

17. The routing device as claimed in claim 12 wherein the first and second buses both substantially comply with a version of an IEEE Std 1394 standard.

18. A routing device configured to couple between a first bus and a second bus to route communications from a first node on the first bus to a second node on the second bus comprising:
   a. a receiving circuit configured to receive a communication from the first node, the communication including an address value having a bus number and a node number, together forming an address of the routing device, and a routing value used to determine an address of the second node;
   b. a parsing circuit coupled to the receiving circuit to extract the routing value from the address value within the communication;
   c. a remapping circuit coupled to the parsing circuit to obtain the routing value from the parsing circuit and remap the address value of the communication thereby forming a remapped communication with a remapped address value corresponding to the address of the second node; and
   d. a transmitting circuit coupled to the remapping circuit and configured to transmit the remapped communication with the remapped address on the second bus to the second node.

19. The routing device as claimed in claim 18 wherein the communication and the remapped communication are bus packets.

20. The routing device as claimed in claim 18 wherein the routing value includes the address of the second node and an offset value within memory space of the second node.

21. The routing device as claimed in claim 18 wherein the remapping circuit includes a routing table.

22. The routing device as claimed in claim 21 wherein the remapping circuit utilizes a table index value within the routing value to obtain the address of the second node from a location within the routing table corresponding to the table index value.

23. The routing device as claimed in claim 18 wherein the first and second buses both substantially comply with a version of an IEEE Std 1394 standard.

24. A network of devices comprising:
   a. a first bus including a first plurality of nodes;
   b. a second bus including a second plurality of nodes; and
   c. a routing device coupled to the first bus and the second bus including:
      i. a receiving circuit configured to receive a communication from one of the first plurality of nodes, the communication including an address value having a bus number and a node number, together forming an address of the routing device, and a routing value used to determine an address of a targeted one of the second plurality of nodes;
      ii. a parsing circuit coupled to the receiving circuit to extract the routing value from the address value within the communication;
      iii. a remapping circuit coupled to the parsing circuit to obtain the routing value from the parsing circuit and remap the address value of the communication thereby forming a remapped communication with a remapped address value corresponding to the address of the targeted one of the second plurality of nodes; and
      iv. a transmitting circuit coupled to the remapping circuit and configured to transmit the remapped communication with the remapped address on the second bus to the targeted one of the second plurality of nodes.

25. The routing device as claimed in claim 24 wherein the communication and the remapped communication are bus packets.

26. The routing device as claimed in claim 24 wherein the routing value includes the address of the targeted one of the second plurality of nodes and an offset value within memory space of the targeted one of the second plurality of nodes.

27. The routing device as claimed in claim 24 wherein the remapping circuit includes a routing table.

28. The routing device as claimed in claim 27 wherein the remapping circuit utilizes a table index value within the routing value to obtain the address of the targeted one of the second plurality of nodes from a location within the routing table corresponding to the table index value.

29. The routing device as claimed in claim 24 wherein the first and second buses both substantially comply with a version of an IEEE Std 1394 standard.

* * * * *